US012803339B2

(12) United States Patent
Xiao et al.

(10) Patent No.: US 12,803,339 B2
(45) Date of Patent: Nov. 17, 2026

(54) WIRELESS POWER TRANSFER SYSTEM WITH POSITION DETECTION FUNCTION AND POSITION ADJUSTMENT METHOD THEREFOR

(71) Applicants: ELECTRIC POWER SCIENCE RESEARCH INSTITUTE OF GUANGXI POWER GRID CO., LTD, Nanning (CN); CHONGQING UNIVERSITY, Chongqing (CN)

(72) Inventors: Jing Xiao, Nanning (CN); Fengwei Chen, Nanning (CN); Ning Wu, Nanning (CN); Chunsen Tang, Nanning (CN); Yuming Zhang, Nanning (CN); Shaonan Chen, Nanning (CN); Min Guo, Nanning (CN); Weidong Chen, Nanning (CN); Xiaoxuan Guo, Nanning (CN); Xiaorui Wu, Nanning (CN); Yuhong Mo, Nanning (CN)

( * ) Notice: Subject to any disclaimer, the term of this patent is extended or adjusted under 35 U.S.C. 154(b) by 0 days.

(21) Appl. No.: 19/336,464

(22) Filed: Sep. 22, 2025

(65) Prior Publication Data

US 2026/0018943 A1 Jan. 15, 2026

Related U.S. Application Data

(63) Continuation of application No. PCT/CN2024/134060, filed on Nov. 25, 2024.

(30) Foreign Application Priority Data

Jul. 9, 2024 (CN) ........................ 202410911249.1

(51) Int. Cl.

| | |
|---|---|
| ***H02J 50/90*** | (2016.01) |
| ***H02J 50/00*** | (2016.01) |
| ***H02J 50/12*** | (2016.01) |

(52) U.S. Cl.

CPC .............. *H02J 50/90* (2016.02); *H02J 50/12* (2016.02); *H02J 50/005* (2020.01)

(58) Field of Classification Search

CPC .......... H02J 50/90; H02J 50/12; H02J 50/005; B60L 53/126; B60L 53/34; B60L 53/38

See application file for complete search history.

(56) References Cited

U.S. PATENT DOCUMENTS

| | | | | |
|---|---|---|---|---|
| 2012/0043931 A1* | 2/2012 | Terao | B60L 53/14 320/108 |
| 2013/0023958 A1* | 1/2013 | Fell | A61N 1/37247 607/61 |

(Continued)

FOREIGN PATENT DOCUMENTS

| | | |
|---|---|---|
| CN | 112350459 A | 2/2021 |
| CN | 112821576 A | 5/2021 |

(Continued)

OTHER PUBLICATIONS

J. Xiao, Y. Mo, S. Chen, W. Gong, X. Wu and Q. Chen, "A static wireless charging position detection system for electric vehicles based on four-coil decoupling," 2023 IEEE 6th International Conference on Information Systems and Computer Aided Education (ICISCAE), Dalian, China, 2023, pp. 206-209, doi: 10.1109/ICISCAE59047.2023.10392728.

(Continued)

*Primary Examiner* — Rexford N Barnie
*Assistant Examiner* — Rasem Mourad

(57) ABSTRACT

The present disclosure provides a wireless power transfer system with a position detection function and a position adjustment method therefor, the system includes an energy transmission component and a signal transmission component, where the energy transmission component includes a power transmitting coil, a power receiving coil and a magnetically integrated resonant coil, and the signal transmis- (Continued)

sion component includes a signal transmitting coil and a signal receiving coil; the power transmitting coil, the magnetically integrated resonant coil and the signal transmitting coil are sequentially stacked, and the power receiving coil and the signal receiving coil are stacked. During position detection, the magnetically integrated resonant coil and the signal receiving coil as detection coils detect position offsets along an X-axis and a Y-axis, respectively. Positions in two directions are detected simultaneously, and the reuse of coils reduces the complexity of the system, and improves the utilization rate of the coils.

7 Claims, 16 Drawing Sheets

(56) References Cited

U.S. PATENT DOCUMENTS

| | | | | |
|---|---|---|---|---|
| 2016/0285312 | A1 | 9/2016 | Maniktala | |
| 2017/0361726 | A1* | 12/2017 | Widmer | B60L 53/122 |
| 2024/0195224 | A1* | 6/2024 | Wang | H02J 50/12 |
| 2024/0258844 | A1* | 8/2024 | Nakanishi | H02J 50/80 |

FOREIGN PATENT DOCUMENTS

| | | | | | |
|---|---|---|---|---|---|
| CN | 114940093 | A | | 8/2022 | |
| CN | 115051482 | A | * | 9/2022 | H02J 50/005 |
| CN | 115642712 | A | | 1/2023 | |
| CN | 116317205 | A | | 6/2023 | |
| CN | 116799977 | A | | 9/2023 | |
| CN | 118920724 | A | | 11/2024 | |
| JP | 2003250233 | A | | 9/2003 | |

OTHER PUBLICATIONS

PCT/CN2024/134060 Written Opinion of the ISA dated Feb. 28, 2025, Original Chinese, pp. 1-5.

PCT/CN2024/134060 Written Opinion of the ISA dated Feb. 28, 2025, English translation, pp. 1-7.

PCT/CN2024/134060 International Search Report dated Feb. 28, 2025, Original Chinese, pp. 1-5.

PCT/CN2024/134060 International Search Report dated Feb. 28, 2025, English translation, pp. 1-5.

* cited by examiner

WIRELESS POWER TRANSFER SYSTEM WITH POSITION DETECTION FUNCTION AND POSITION ADJUSTMENT METHOD THEREFOR

CROSS-REFERENCE TO RELATED APPLICATIONS

This application is a continuation of International Application No. PCT/CN2024/134060, filed on Nov. 25, 2024, which claims priority to Chinese Patent Application No. 202410911249.1, filed on Jul. 9, 2024. All of the aforementioned applications are incorporated herein by reference in their entireties.

TECHNICAL FIELD

The present disclosure relates to the field of wireless power transfer, and in particular, relates to a wireless power transfer system with a position detection function and a position adjustment method therefor.

BACKGROUND

In-depth research has been conducted both domestically and internationally on the issue of position detection of receivers in electric vehicle wireless power transfer (EV-WPT) systems, and numerous research results have been achieved. Depending on different detection methods, they can be roughly classified into non-magnetic field sensing and magnetic field sensing. The non-magnetic sensing includes cameras, radio frequency identification (RFID), ultra-wideband (UWB) and wireless fidelity (WIFI), but the alignment accuracy of WIFI and UWB positioning technology is relatively low, which is generally 10 cm or above. The camera and RFID positioning technology can achieve centimeter-level alignment accuracy, but camera positioning is obviously affected by severe weather. Meanwhile, both technologies have relatively high costs and realize the positioning of a vehicle relative to a marker. Therefore, it is impossible to judge the alignment of primary-side and secondary-side magnetic coupling mechanisms. As for the magnetic field sensing, the change of a magnetic field is sensed by detection coils to identify the change of the position of the receiver. There are two different forms of detection coils: one is a detection coil independently designed to be not interfere with a coil of a coupling mechanism of the system; and the other is to reuse the coil of the coupling mechanism of the system as the detection coil.

In the EV-WPT system, the magnetic field sensing technology is required to detect the position of the receiver, so as to better guarantee power and efficiency. In the existing research, a position detection method for a receiver includes symmetrically placing four detection coils flat at four corners of the coupling mechanism to realize the position detection of the receiver, and allowing orthogonal coils wound around a transmitter coupling mechanism to determine the alignment of the receiver; detecting the position of a receiving coil with a transmitting coil in the alignment stage in a time division multiplexing manner; and determining whether the receiver is aligned by using a compensation coil in the alignment stage in a topological switching manner. However, the costs and complexity of the system will be increased by using a detection coil alone in existing position detection methods, and there are the problems that only a single direction can be detected or the accuracy is low due to the fact that a coil of a coupling mechanism is reused as a detection coil.

SUMMARY

The present disclosure aims to provide a wireless power transfer system with a position detection function and a position adjustment method therefor. The wireless power transfer system with a position detection function and a position adjustment method therefor are used for solving the problems the costs and complexity of the system will be increased by using a detection coil alone in existing position detection methods, and the problems that only a single direction can be detected or the accuracy is low due to reuse of a coil of a coupling mechanism as a detection coil.

A wireless power transfer system with a position detection function, including: an energy transmission component and a signal transmission component, where the energy transmission component includes a power transmitting coil, a power receiving coil, and a magnetically integrated resonant coil; and the signal transmission component includes a signal transmitting coil and a signal receiving coil; and the power transmitting coil, the magnetically integrated resonant coil and the signal transmitting coil are sequentially stacked, and the power receiving coil and the signal receiving coil are stacked; and during position detection, the magnetically integrated resonant coil and the signal receiving coil as detection coils detect position offsets along an X-axis and a Y-axis, respectively.

Optionally, the power transmitting coil and the power receiving coil are each a Q-type coil; and the signal transmitting coil and the signal receiving coil are each a DD-type coil that is symmetric about the X-axis, and the magnetically integrated resonant coil is a DD-type coil that is symmetric about the Y-axis.

Optionally, the energy transmission component further includes a transmitter transmission circuit and a receiver transmission circuit;

the transmitter transmission circuit includes a direct current (DC) power supply, an inverter circuit and a primary-side compensation circuit that are sequentially connected, where an output end of the primary-side compensation circuit is connected to the power transmitting coil; and the receiver transmission circuit includes a secondary-side compensation circuit and a rectifier-filter circuit that are sequentially connected, where an input end of the secondary-side compensation circuit is connected to the power receiving coil, and an output end of the rectifier-filter circuit is connected to a load.

Optionally, the primary-side compensation circuit and the secondary-side compensation circuit form an inductor-capacitor-capacitor to series (LCC-S) resonant compensation network.

Optionally, the transmitter transmission circuit further includes a single-pole double-throw switch S configured to control connection or disconnection between the magnetically integrated resonant coil and the primary-side compensation circuit; and an input end of the single-pole double-throw switch S is connected to an output end of the inverter circuit, a control end A of the single-pole double-throw switch S is connected to one end of the magnetically integrated resonant coil, and another control end B of the single-pole double-throw switch S and another end of the magnetically integrated resonant coil are both connected to an input end of the primary-side compensation circuit.

Optionally, during position detection, the input end S of the single-pole double-throw switch is connected to the control end B, and the magnetically integrated resonant coil is not incorporated into the primary-side compensation circuit; and during wireless power transfer, the input end S of the single-pole double-throw switch is connected to the control end A, and the magnetically integrated resonant coil is incorporated into the primary-side compensation circuit.

Optionally, the signal transmission component further includes a signal modulation circuit and a signal demodulation and acquisition circuit; and an output end of the signal modulation circuit is connected to the signal transmitting coil, and an input end of the signal demodulation and acquisition circuit is connected to the signal receiving coil.

A position adjustment method of a wireless power transfer system with a position detection function, where the position adjustment method is configured to adjust a position of a receiver of the aforementioned wireless power transfer system with the position detection function, and includes the following steps:

S1: controlling an input end S of a single-pole double-throw switch to be connected to a control end B;

S2: acquiring an induced voltage from a signal receiving coil, determining whether an offset exists in a Y-axis direction, and adjusting the position of the receiver in the Y-axis direction; and S3: acquiring an induced voltage of a magnetically integrated resonant coil and a phase difference between the induced voltage of the magnetically integrated resonant coil and an inverter output voltage, determining whether an offset exists in an X-axis direction, and adjusting the position of the receiver in the X-axis direction.

Optionally, in step S2, the method of adjusting the position of the receiver in the Y-axis direction includes:

if the induced voltage from the signal receiving coil is greater than 0, determining that an offset exists in the receiver in the Y-axis direction, adjusting the position of the receiver in the Y-axis direction, and acquiring the induced voltage from the signal receiving coil in real time until the induced voltage from the signal receiving coil is equal to 0 V, thereby completing offset correction in the Y-axis direction.

Optionally, in step S3, the method of adjusting the position of the receiver in the X-axis direction, includes:

if the induced voltage from the magnetically integrated resonant coil is greater than 0 V, determining that an offset exists in the receiver in the X-axis direction, and determining an offset direction based on the phase difference; and based on the offset direction, adjusting the position of the receiver in the X-axis direction, and acquiring the induced voltage from the magnetically integrated resonant coil in real time until the induced voltage from the magnetically integrated resonant coil is equal to 0 V, thereby completing offset correction in the X-axis direction.

Since the above-mentioned technical solution is employed, the present disclosure has the following advantages:

1. In the position detection stage, the magnetically integrated resonant coil and the signal receiving coil are reused to detect the alignment state of the receiver on the X-axis and the Y-axis, and positions in two directions are detected simultaneously, and the reuse of coils reduces the complexity of the system, and improves the utilization rate of the coils.
2. In the present disclosure, the induced voltages from the magnetically integrated resonant coil and the signal receiving coil are acquired to identify whether there is an offset on the X-axis and the Y-axis, and the offset direction of the X-axis is identified based on the phase difference, and the position of the receiver is adjusted according to the identification result, so that the alignment accuracy of the receiver is high.

Other advantages, objects and features of the present disclosure will be set forth in the following description to some extent, and to some extent, will become apparent to those skilled in the art from the following investigation and study, or may be learned from the practice of the present disclosure. The objects and other advantages of the present disclosure can be realized and obtained by the following description.

BRIEF DESCRIPTION OF THE DRAWINGS

The brief description of the drawings of the present disclosure is as follows.

In the figures: $L_P$ is the power transmitting coil; $L_S$ is the power receiving coil; $L_{f1}$ is the magnetically integrated resonant coil; $L_{DP}$ is the signal transmitting coil; and $L_{DS}$ is the signal receiving coil.

DETAILED DESCRIPTION OF THE EMBODIMENTS

The present disclosure is further described below in conjunction with the accompanying drawings and the embodiments.

Embodiment 1

Figure 1:
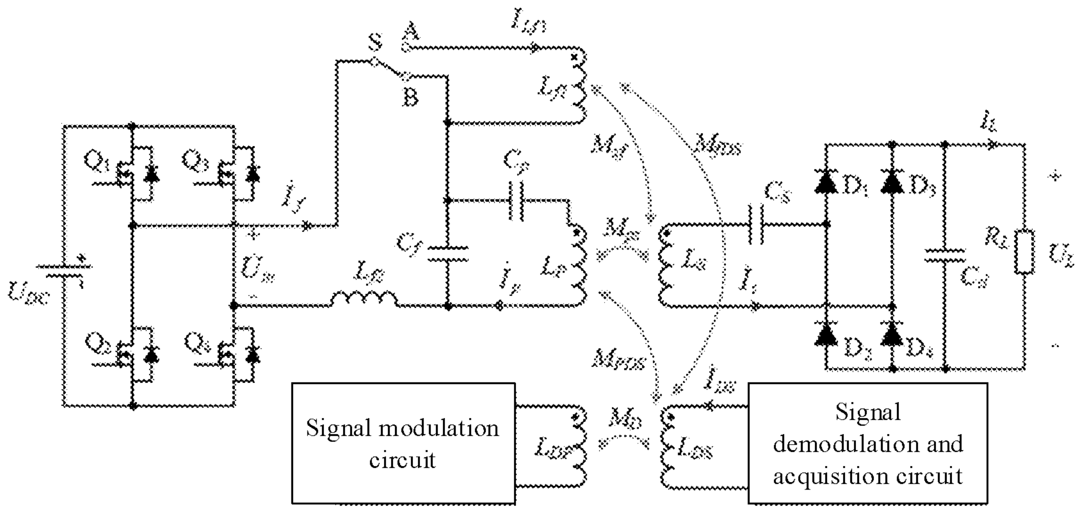
FIG. 1 is an equivalent circuit diagram of a wireless power transfer system with a position detection function according to the present disclosure.

A wireless power transfer system with a position detection function as shown in FIG. 1 includes an energy transmission component and a separate signal transmission component.

The energy transmission component includes a transmitter transmission circuit and a receiver transmission circuit, where the transmitter transmission circuit includes a DC power supply $U_{DC}$, an inverter circuit and a primary-side compensation circuit that are sequentially connected, where the output end of the primary-side compensation circuit is connected to the power transmitting coil $L_P$.

The receiver transmission circuit includes a secondary-side compensation circuit and a rectifier-filter circuit that are sequentially connected, where the input end of the secondary-side compensation circuit is connected to the power receiving coil $L_S$, and the output end of the rectifier-filter circuit is connected to a load $R_L$.

In this embodiment, the inverter circuit is a full-bridge inverter composed of Q1 to Q4, and the rectifier-filter circuit includes a rectifier composed of four diodes D1 to D4 and a filter capacitor Ca.

As shown in FIG. 1, the signal transmission circuit further includes a signal modulation circuit and a signal demodulation and acquisition circuit, where the output end of the signal modulation circuit is connected to the signal transmitting coil $L_{DP}$, and the input end of the signal demodulation and acquisition circuit is connected to the signal receiving coil $L_{DS}$.

As shown in FIG. 1, a magnetically integrated resonant coil $L_{f1}$ is further included, where the power transmitting coil $L_P$, the magnetically integrated resonant coil $L_{f1}$ and the signal transmitting coil $L_{DP}$ are sequentially stacked and aligned with their center points, and the power receiving coil $L_S$ and the signal receiving coil $L_{DS}$ are stacked and aligned with their center points. Therefore, the coils at the transmitter and receiver are decoupled from each other.

Figure 2:
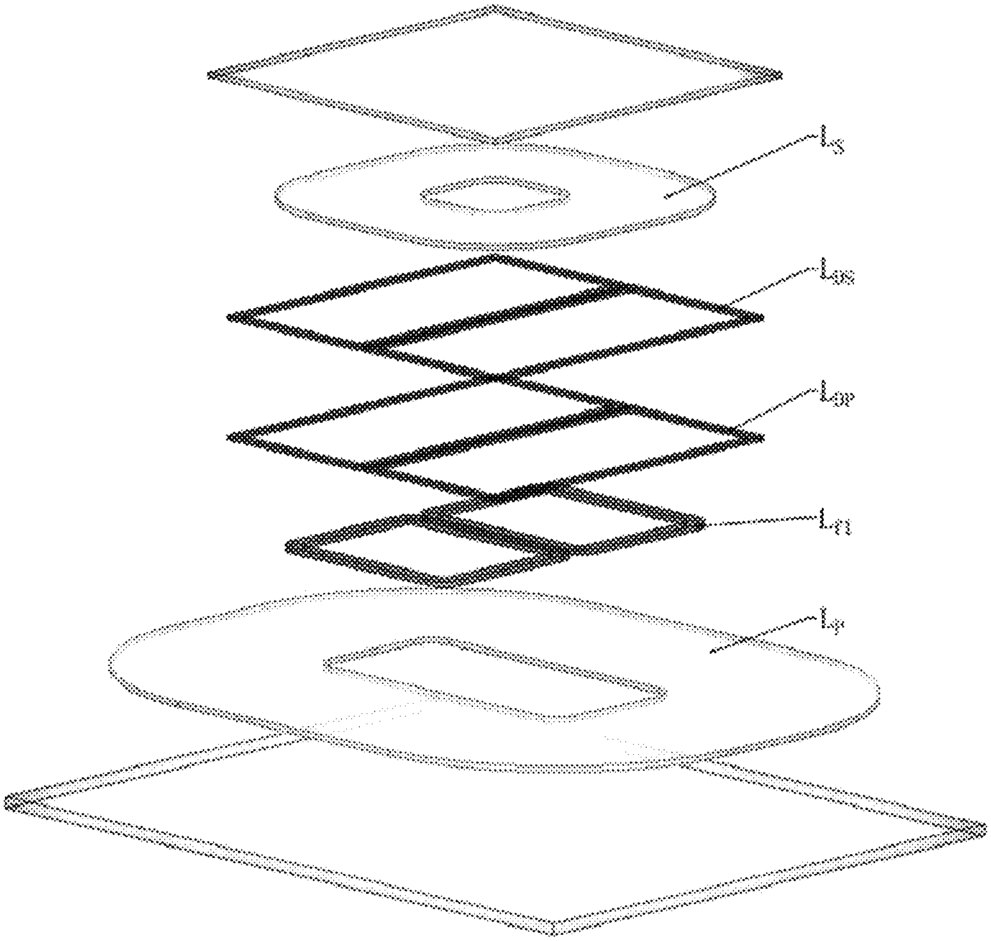
FIG. 2 is an exploded view of a coupling mechanism of a wireless power transfer system with a position detection function according to the present disclosure.
Figure 3:
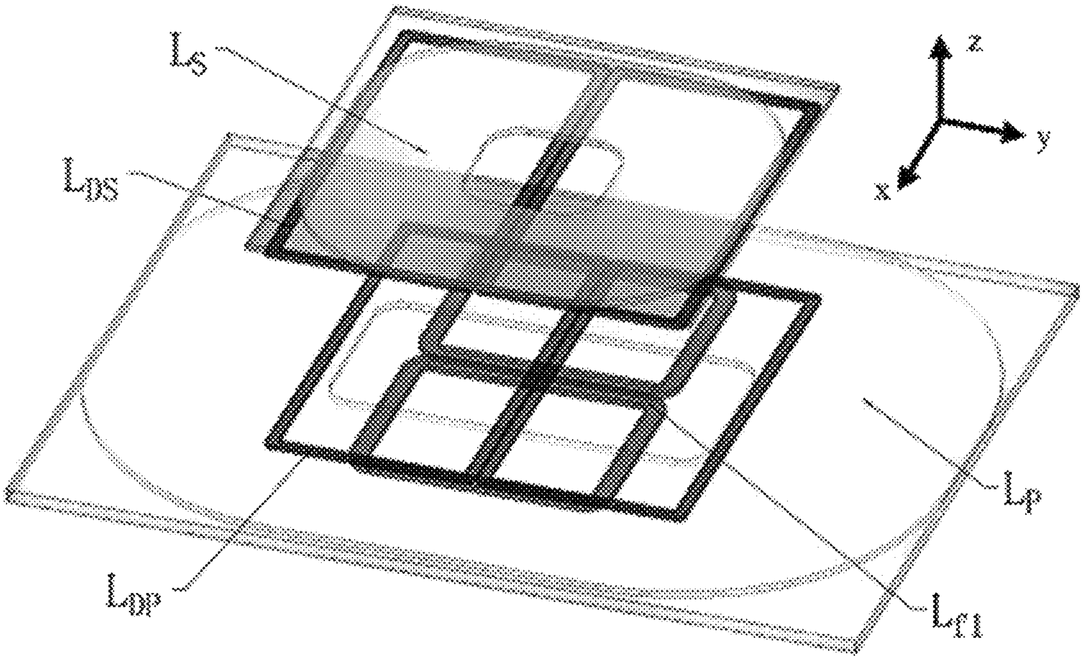
FIG. 3 is a structural diagram of a coupling mechanism of a wireless power transfer system with a position detection function according to the present disclosure.

As shown in FIG. 2 and FIG. 3, in order to eliminate the coupling between the power transmitting coil $L_P$, the magnetically integrated resonant coil $L_{f1}$ and the signal transmitting coil $L_{DP}$ and reduce the complexity of the system, the power transmitting coil $L_P$ and the power receiving coil $L_S$ are each a Q-type coil, the signal transmitting coil $L_{DP}$ and the signal receiving coil $L_{DS}$ are each a DD-type coil that is symmetric about the X-axis, and the magnetically integrated resonant coil $L_{f1}$ is a DD-type coil that is symmetric about the Y-axis.

In this embodiment, when an electric vehicle drives moves in to a parking spot, the position offset of the receiver is decomposed into two variables: ΔX and ΔY. In order to achieve the lightweight design of a receiver coupling mechanism and reduce the complexity of the system, the magnetically integrated resonant coil $L_{f1}$ and the signal receiving coil $L_{DS}$ are used as detection coils to detect the position offsets along an X-axis and a Y-axis, respectively.

As shown in FIG. 1, in order to better meet the lightweight requirements of the receiver, an LCC-S resonant compensation network is often used in the primary-side compensation circuit and the secondary-side compensation circuit.

In this embodiment, as shown in FIG. 1, the primary-side compensation circuit includes a primary-side compensation inductor $L_{f2}$, a primary-side compensation capacitor $C_f$ and a primary-side compensation capacitor $C_p$; one end of the primary-side compensation inductor $L_{f2}$ is connected to an output end of the inverter circuit, and the other end of the primary-side compensation inductor $L_{f2}$ is connected to one end of the power transmitting coil $L_P$ after being connected to one end of the primary-side compensation capacitor $C_f$, one end of the primary-side compensation capacitor $C_p$ is connected to the other end of the power transmitting coil $L_P$, and the other end of the primary-side compensation capacitor $C_p$ is connected to the other end of the primary-side compensation capacitor $C_f$.

In this embodiment, as shown in FIG. 1, the secondary-side compensation circuit includes a secondary-side compensation capacitor $C_s$, where one end of the secondary-side compensation capacitor $C_s$ is connected to the power receiving coil $L_S$, and the other output end of the secondary-side compensation capacitor $C_s$ is connected to an output end of the rectifier-filter circuit.

As shown in FIG. 1, the transmitter transmission circuit further includes a single-pole double-throw switch configured to control connection or disconnection between the magnetically integrated resonant coil $L_{f1}$ and the primary-side compensation circuit.

The input end S of the single-pole double-throw switch is connected to an output end of the inverter circuit, a control end A of the single-pole double-throw switch is connected to one end of the magnetically integrated resonant coil $L_{f1}$, and the other control end B of the single-pole double-throw switch and the other end of the magnetically integrated resonant coil $L_{f1}$ are both connected to an input end of the primary-side compensation circuit.

Figure 4:
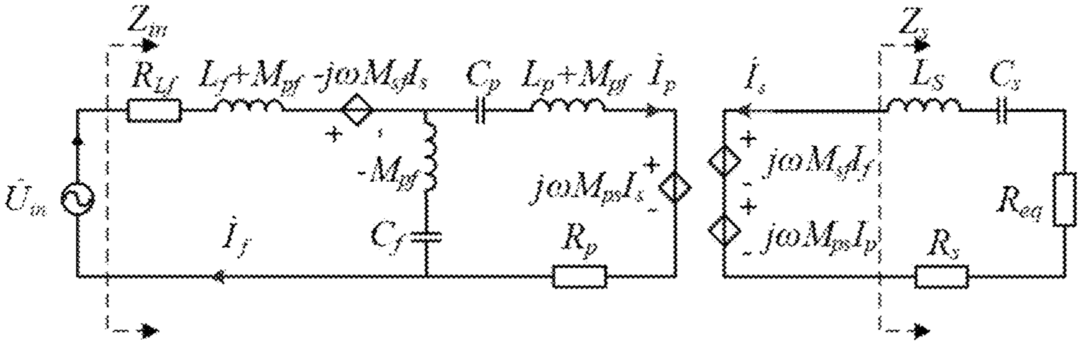
FIG. 4 is an equivalent circuit model of a system in the wireless power transfer process of the system according to the present disclosure.

In this embodiment, in order to realize the impedance balance of the compensation network and avoid that the system is damaged by heavy current impact in the position detection stage, the compensation inductor $L_f$ is split into two compensation inductors connected in series, where $L_{f1}$ is a magnetically integrated resonant coil magnetically integrated in a transmitter coupling mechanism, and $L_{f2}$ is a separate compensation inductor installed in an inverter cabinet. During position detection, the input end S of the single-pole double-throw switch is connected to the control end B, and as the detection coils, the magnetically integrated resonant coil $L_{f1}$ and the signal receiving coil $L_{DS}$ detect the position offsets along the X-axis and the Y-axis, respectively. When the receiver and transmitter are aligned in position, the system enters a power transfer stage, the input end S is connected to the control end A, and the system starts high-power power transfer. In the power transfer stage of the system, an equivalent circuit model of an EV-WPT system is as shown in FIG. 4.

In this embodiment, when the system is in a resonant state, the expression of the angular frequency ω of the system is as follows:

$$\begin{cases} \omega L_f = \dfrac{1}{\omega C_f} \\ \omega(L_p - L_f) = \dfrac{1}{\omega C_p} \\ \omega L_s = \dfrac{1}{\omega C_s} \end{cases}$$

$$\text{i.e.: } \omega = \frac{1}{\sqrt{L_f C_f}} = \frac{1}{\sqrt{(L_p - L_f)C_p}} = \frac{1}{\sqrt{L_s C_s}}$$

According to the Kirchhoff Voltage Law (KVL), KVL equations of the system are formulated as follows:

$$\begin{bmatrix} \dot{U}_{in} \\ 0 \\ 0 \end{bmatrix} = \begin{bmatrix} R_{Lf} & j\omega M_{pf} - \dfrac{1}{j\omega C_f} & j\omega M_{sf} \\ j\omega M_{pf} - \dfrac{1}{j\omega C_f} & R_p & j\omega M_{ps} \\ j\omega M_{sf} & j\omega M_{ps} & R_s + R_{eq} \end{bmatrix} \cdot \begin{bmatrix} \dot{I}_f \\ \dot{I}_p \\ \dot{I}_s \end{bmatrix}$$

Considering that the internal resistance $R_{Lf}$ of the magnetically integrated resonant coil $L_{f1}$, the internal resistance $R_P$ of the power transmitting coil $L_P$ and the internal resistance $R_S$ of the power receiving coil are generally several mΩ in practice, which are far less than the load resistance $R_L$. Therefore, the influence of the internal resistance of the coil is ignored in theoretical analysis, thereby simplifying the analysis of the input and output voltage and current and output power characteristics of the system. The following equation is derived by solving:

$$\begin{cases} \dot{I}_f = \dfrac{M_{ps}^2 \dot{U}_{in}}{(M_{pf} + L_f)^2 R_{eq} - 2j\omega M_{ps} M_{sf}(M_{pf} + L_f)} \\ \dot{I}_p = \dfrac{-(j(M_{pf} + L_f)R_{eq} + \omega M_{ps} M_{sf})\dot{U}_{in}}{(\omega(M_{pf} + L_f)^2 R_{eq} - 2j\omega^2 M_{ps} M_{sf}(M_{pf} + L_f)} \\ \dot{I}_s = \dfrac{\omega M_{ps}(M_{pf} + L_f)}{j\omega(M_{pf} + L_f)R_{eq} + \omega M_{ps} M_{sf}} \dot{I}_p \end{cases}$$

When the coupling mechanism of the system is aligned in ideal conditions, $M_{pf}$=0 uH and $M_{sf}$=0 uH, whereby the above equation can be simplified as:

$$\begin{cases} \dot{I}_f = \dfrac{M_{ps}^2 U_{in}}{L_f^2 R_{eq}} \\ \dot{I}_p = \dfrac{U_{in}}{j\omega L_f} \\ \dot{I}_s = \dfrac{M_{ps} U_{in}}{L_f R_{eq}} \end{cases}$$

The output voltage, output power and efficiency of the system are derived:

$$\begin{cases} U_L = I_s R_{eq} = \dfrac{M_{ps}}{L_f} U_{in} \\ P_{in} = U_{in} I_f \\ P_{out} = \dot{I}_s^2 R_{eq} \\ \eta = \dfrac{P_{out}}{P_{in}} \end{cases}$$

It can be seen that the design difficulty of the system can be simplified by selecting shapes for the magnetically integrated resonant coil and power coil, thereby realizing the characteristics of constant current input and constant voltage output of a conventional LCC-S resonant compensation network.

Embodiment 2

Figure 16:
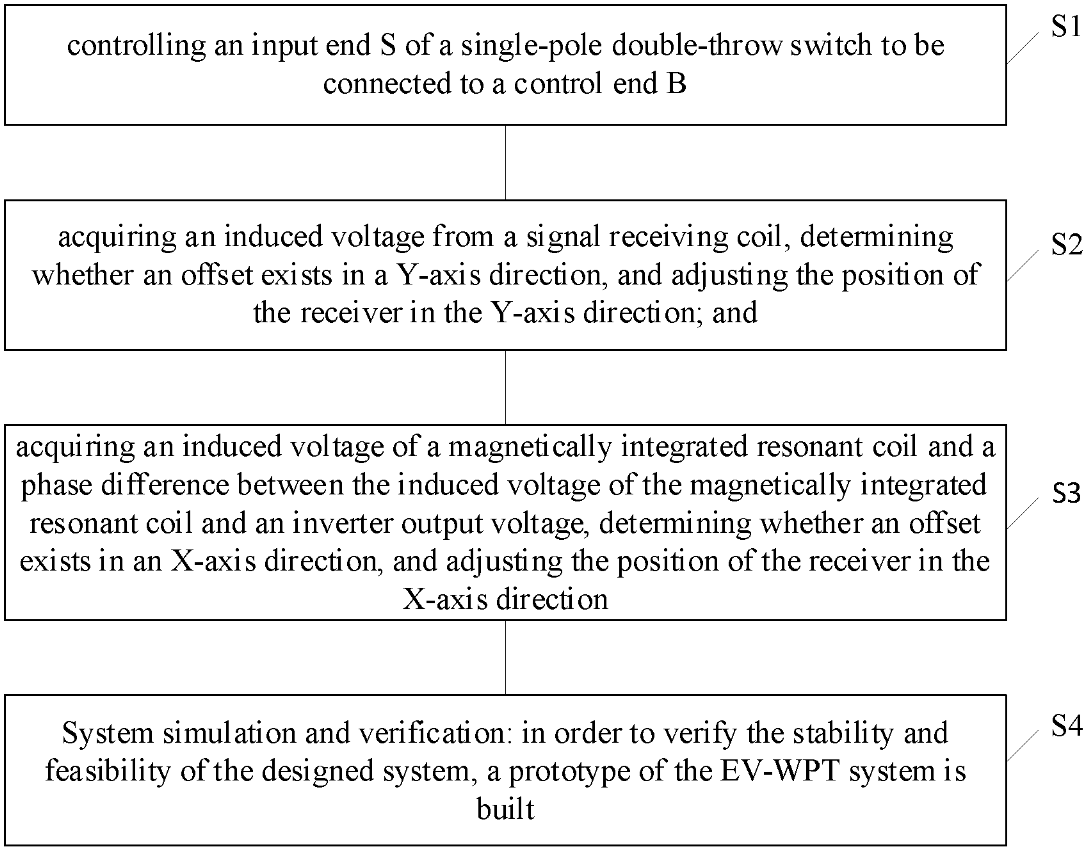
FIG. 16 is an effect diagram showing a position adjustment method of a wireless power transfer system with a position detection function according to the present disclosure.

A position adjustment method of a wireless power transfer system with a position detection function, where the position adjustment method is configured to adjust a position of a receiver of the wireless power transfer system with a position detection function described in Embodiment 1, as show in FIG. 16, and includes the following steps:

S1: controlling the input end S of a single-pole double-throw switch to be connected to a control end B.

S2: acquiring an induced voltage from the signal receiving coil $L_{DS}$; if the induced voltage from the signal receiving coil $L_{DS}$ is greater than 0, determining that an offset exists in the receiver in the Y-axis direction, adjusting the position of the receiver in the Y-axis direction, and acquiring the induced voltage from the signal receiving coil $L_{DS}$ in real time until the induced voltage from the signal receiving coil $L_{DS}$ is equal to 0 V, thereby completing offset correction in the Y-axis direction.

S3: acquiring an induced voltage from the magnetically integrated resonant coil $L_{f1}$ and a phase difference between the induced voltage of the magnetically integrated resonant coil and an inverter output voltage; if the induced voltage from the magnetically integrated resonant coil $L_{f1}$ is greater than 0 V, determining that an offset exists in the receiver in the X-axis direction, and determining an offset direction based on the phase difference.

Based on the offset direction, adjusting the position of the receiver in the X-axis direction, and acquiring the induced voltage from the magnetically integrated resonant coil $L_{f1}$ in real time until the induced voltage from the magnetically integrated resonant coil $L_{f1}$ is equal to 0 V, thereby completing offset correction in the X-axis direction.

Figure 5:
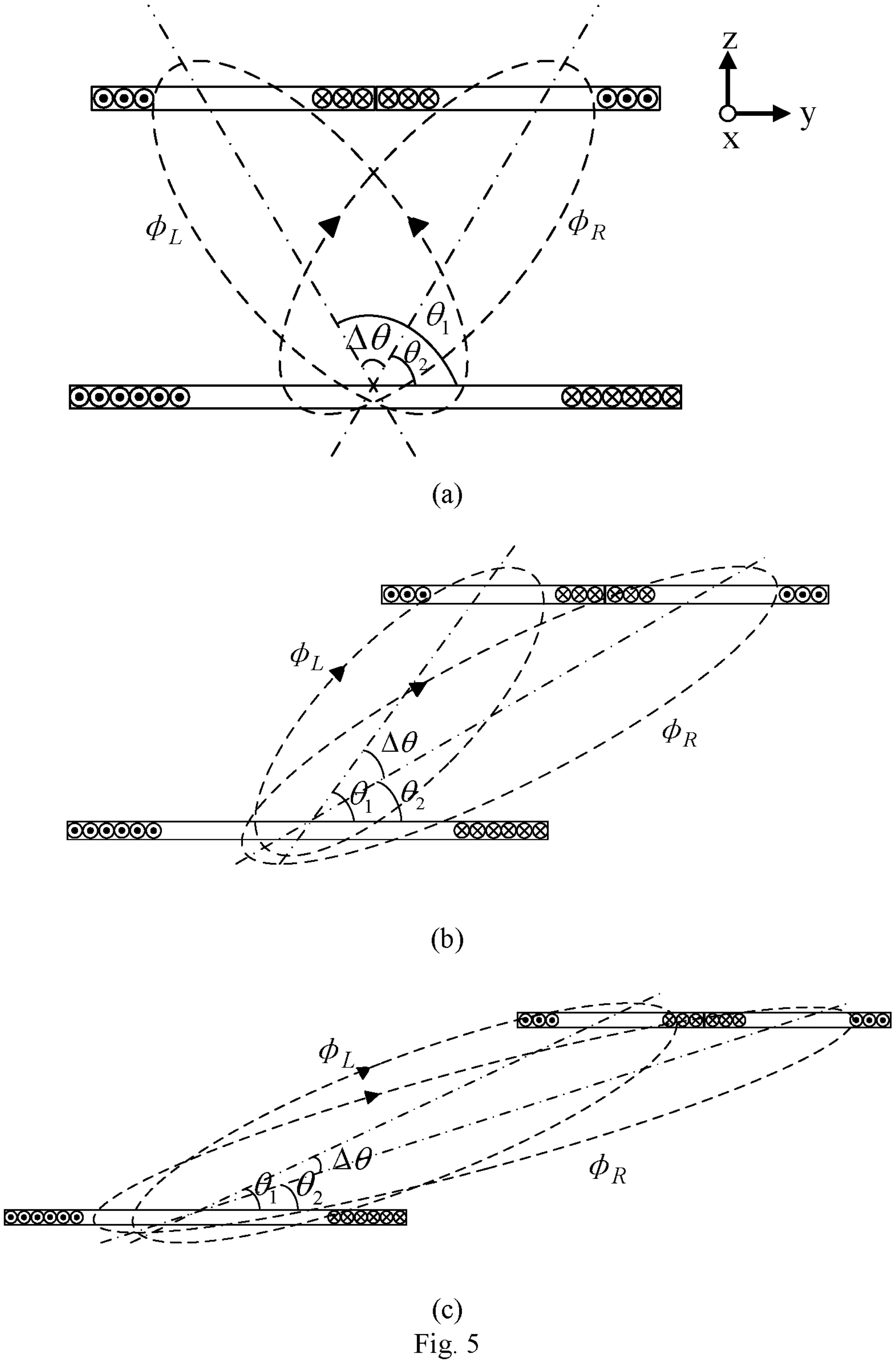
FIG. 5 is a misalignment diagram of a signal receiving coil at a receiver along the positive direction of the Y-axis in the simulation according to the present disclosure.

In this embodiment, the magnetically integrated resonant coil $L_{f1}$ and the signal receiving coil $L_{DS}$ are each a DD-type coil, and have the same position detection principle. Taking the signal receiving coil $L_{DS}$ as an example, a schematic diagram of the offset of a receiver coupling mechanism in the positive direction of the Y-axis is as shown in FIG. 5. The mutual inductance between Q-type coil and DD-type coil can be expressed as:

$$M = \frac{\phi_L - \phi_R}{\dot{I}} = \frac{BS(\cos\theta_1 - \cos\theta_2)}{\dot{I}}$$

-continued $$= \frac{BS(\cos\theta_2 + \Delta\theta) - \cos\theta_2)}{\dot{I}}$$

When the receiver coupling mechanism offsets in the positive direction of the Y-axis, the relative position of the receiver coupling mechanism and a ground-side coupling mechanism will have three cases. As shown in FIG. 5, when changing from FIG. 5(*a*) to FIG. 5(*b*), M gradually increases from 0 to $M_{max}$. When changing from FIG. 5(*b*) to FIG. 5(*c*), M gradually decreases from $M_{max}$ to 0. When the receiver offsets in the negative direction of the Y-axis, due to the design symmetry of the coupling mechanism, the change of M is similar to that when the receiver offsets in the positive direction, with only the direction of magnetic line cutting opposite. Therefore, the change curve of M is consistent and the generated induced current is opposite in direction.

Considering the constraint of a charging pad on an electric vehicle in the Y-axis direction when the electric vehicle is parked, and the mutual inductance M of the electric vehicle in the Y-axis direction is less than $M_{max}$, then in the process of $\Delta Y \rightarrow 0$ in the Y-axis direction, when the offset in Y-axis direction is 0, the mutual inductance between the signal receiving coil $L_{DS}$ and the power transmitting coil $L_P$ becomes 0 μH, that is, the induced voltage from the signal receiving coil $L_{DS}$ is reduced to 0 V. At this time, it can be judged that the receiver coupling mechanism is aligned in the Y-axis direction.

Figure 6:
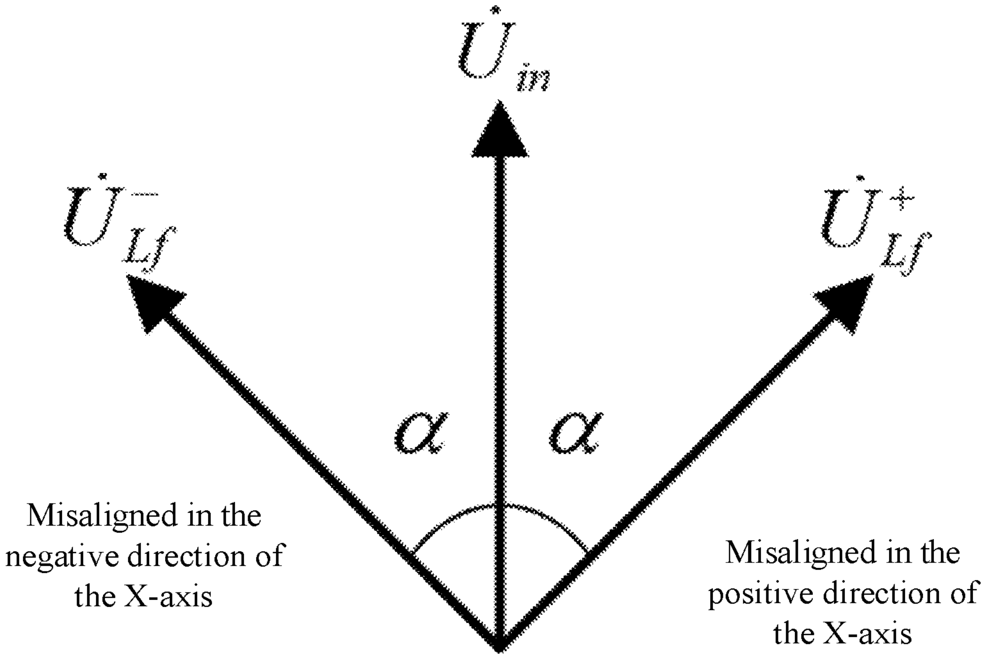
FIG. 6 is a vector diagram of an inverter voltage and an induced voltage from a magnetically integrated resonant coil of the system according to the present disclosure.

Similarly, since the two D-type coils composing the magnetically integrated resonant coil $L_{f1}$ are symmetrical in the Y-axis direction, the magnetically integrated resonant coil $L_{f1}$ can detect whether $\Delta X$ is 0 by sampling the voltage from the magnetically integrated resonant coil $L_{f1}$ when the receiver coupling mechanism offsets and this detection is not affected by the offset in the Y-axis direction. When the receiver offsets in the positive direction (negative direction) of the X-axis, there is a phase difference of +90(−90) degrees between the voltage from the magnetically integrated resonant coil $L_{f1}$ and the voltage from the power receiving coil $L_S$, and the phase difference between the voltage from the power receiving coil $L_S$ and the voltage of the power transmitting coil $L_P$ is 90 degrees, then the voltage phase difference between the magnetically integrated resonant coil $L_{f1}$ and the power transmitting coil $L_P$ is 0(180) degrees. However, after passing through the primary-side LCC compensation network, an inverter voltage from the system will develops a phase difference with the voltage from the power transmitting coil, then a vector diagram of the inverter voltage and the induced voltage from the resonant coil is as shown in FIG. 6. Only when the receiver coupling mechanism shifts from the offset in the positive direction to the offset in the negative direction will the phase difference change from 0+α to 0−α, and vice versa. Therefore, the offset direction of the X-axis can be determined by comparing the phase difference between the voltage from the magnetically integrated resonant coil $L_{f1}$ and the inverter voltage.

Figure 7:
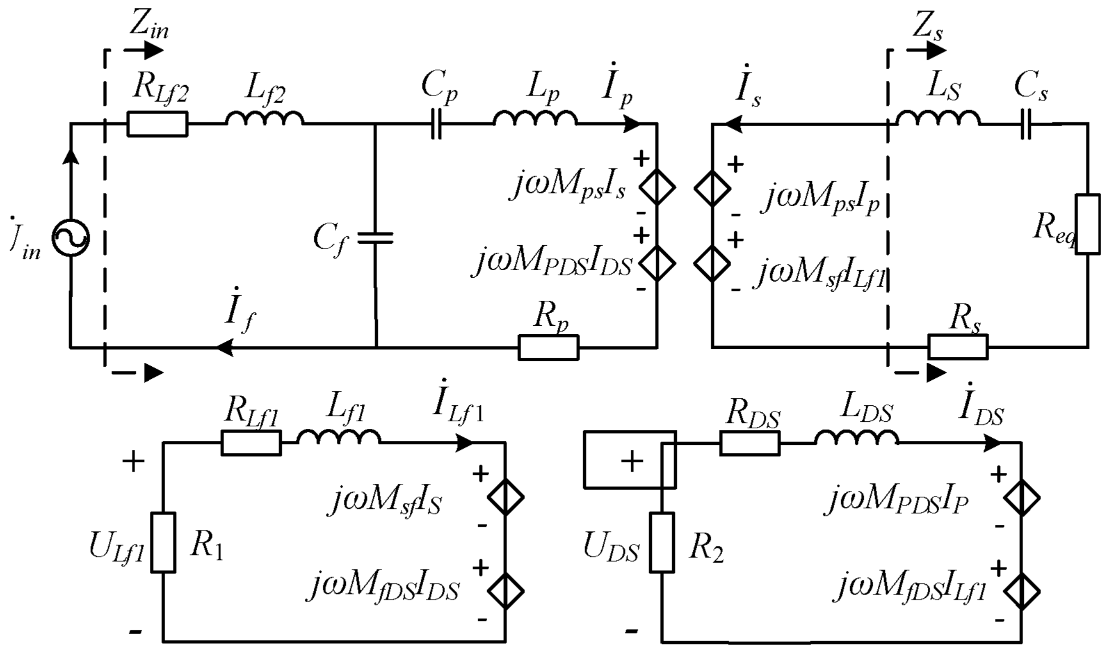
FIG. 7 is an equivalent circuit model of a system in the position detection process of the system according to the present disclosure.

In the position detection stage, the equivalent circuit model of the system is as shown in FIG. 7. Ignoring the influence of the internal resistance of each coil, the system equation of the equivalent circuit model can be expressed as:

$$\begin{bmatrix} \dot{U}_{in} \\ 0 \\ 0 \\ \dot{U}_{Lf1} \\ \dot{U}_{DS} \end{bmatrix} =$$

$$\begin{bmatrix} j\omega L_{f2} + \frac{1}{j\omega C_f} & -\frac{1}{j\omega C_f} & 0 & 0 & 0 \\ -\frac{1}{j\omega C_f} & 0 & j\omega M_{ps} & 0 & j\omega M_{PDS} \\ 0 & j\omega M_{ps} & R_{eq} & j\omega M_{sf} & 0 \\ 0 & 0 & j\omega M_{sf} & j\omega L_{f1} & j\omega M_{fDS} \\ 0 & j\omega M_{PDS} & 0 & j\omega M_{fDS} & 0 \end{bmatrix} \begin{bmatrix} \dot{I}_f \\ \dot{I}_p \\ \dot{I}_s \\ \dot{I}_{Lf1} \\ \dot{I}_{DS} \end{bmatrix}$$

Respective current magnitudes of the energy transmission channel are derived by solving:

$$\begin{cases} \dot{I}_f = \frac{2\omega^2 C_f(\omega M_{ps}B - C - D)}{A} \\ \dot{I}_p = \frac{\omega C_f(2\dot{U}_{in}R_{eq} - j\omega C - j\omega D)}{A} \\ \dot{I}_s = \frac{\omega(2M_{sf}\dot{I}_{Lf1} - \omega^2 C_f M_{ps} M_{PDS}\dot{I}_{DS} - j2B}{A} \end{cases}$$

where:

$$A = \omega^3 C_f M_{ps}^2 + 2jR_{eq}$$

$$B = \omega C_F M_{ps}\dot{U}_{in}$$

$$C = M_{PDS}\dot{I}_{DS}R_{eq}$$

$$D = \omega M_{ps}M_{sf}\dot{I}_{Lf1}$$

When offset occurs on the X-axis and the Y-axis, the values of $M_{sf}$ and $M_{PDS}$ are much greater than $M_{fDS}$, then primary and secondary factors determining the current change can be determined. The induced voltage from the signal receiving coil $L_{DS}$ and the induced voltage of the magnetically integrated resonant coil I can be expressed as follows in a detection coil loop:

$$\begin{cases} \dot{U}_{DS} = j\omega M_{PDS}\dot{I}_p + j\omega M_{fDS}\dot{I}_{Lf1} + (j\omega L_{f1} + R_1)\dot{I}_{DS} \\ \dot{U}_{Lf1} = j\omega M_{sf}\dot{I}_s + j\omega M_{fDS}\dot{I}_{DS} + (j\omega L_{f1} + R_1)\dot{I}_{Lf1} \end{cases}$$

The induced voltage from the detection coil is further derived:

$$\begin{cases} U_{DS} = \frac{\omega^2 C_f M_{PDS}(-\omega D + \omega C + 2U_{in}R_{eq})}{\omega^6 C_f^2 M_{ps}^4 - 4R_{eq}^2} \\ U_{Lf1} = \frac{\omega^2((2\omega M_{sf}B - 2L_{f1}I_{Lf1}R_{eq})^2 - (2\omega M_{sf}^2 I_{Lf1} + \omega^2 C_f L_{f1}D)^2)}{\omega^6 C_f^2 M_{ps}^4 - 4R_{eq}^2} \end{cases}$$

Figure 8:
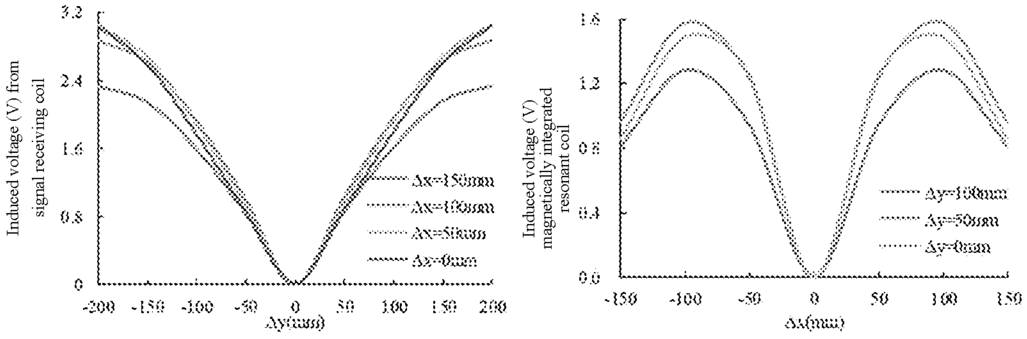
FIG. 8 is a diagram showing the variation of an induced voltage from a signal receiving coil with $\Delta Y$ and an induced voltage of a magnetically integrated resonant coil with $\Delta X$ according to the present disclosure.

From the above equation, the variation trend of the signal receiving coil $L_{DS}$ with $\Delta Y$ can be derived, and the variation trend of the induced voltage from the magnetically integrated resonant coil $L_{f1}$ with $\Delta X$ is as shown in FIG. 8. When the receiver is misaligned, the induced voltage from the detection coil is greater than 0 V, and meanwhile, the offset direction of the X-axis can be determined by sampling the inverter output voltage and the induced voltage from the magnetically integrated resonant coil $L_{f1}$ to calculate the phase difference.

S4: System simulation and verification: in order to verify the stability and feasibility of the designed system, a prototype of the EV-WPT system is built, and its circuit structure is as shown in FIG. 1. Each parameter of the prototype of the system is shown in Table 1. In Table 1, the phase is P and the amplitude is A.

TABLE 1

Data acquisition from six test points

| Parameters | Numerical values | Parameters | Numerical values |
|---|---|---|---|
| $U_{dc}$(V) | 700 | $L_s$(μH) | 135.88 |
| $L_{f1}$(μH) | 11.3 | $M_{ps}$(μH) | 13.54 |
| $L_{f2}$(μH) | 10.8 | $M_{pf}$(μH) | 0.02 |
| $C_f$(nF) | 158.84 | $M_{sf}$(μH) | 0.02 |
| $C_p$(nF) | 139.19 | $C_s$(nF) | 25.72 |
| $L_p$(μH) | 47.54 | $R_L$(Ω) | 14.5 |

Verification of Position Detection on Receiver:

At the rated transmission distance of 16 cm, the capability of the magnetically integrated resonant coil $L_{f1}$ and the signal receiving coil $L_{DS}$ to detect the position offset of the receiver is verified.

Figure 9:
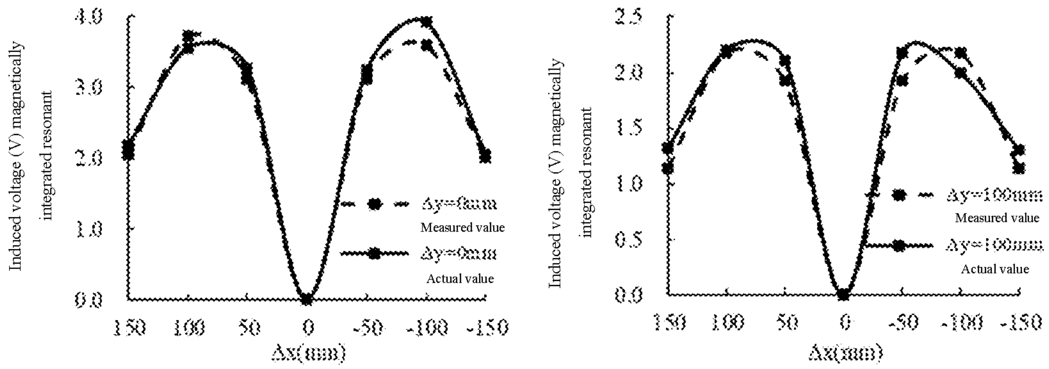
FIG. 9 is a diagram showing the variation of an induced voltage from a signal receiving coil with $\Delta Y$ according to the present disclosure.

Firstly, the signal receiving coil $L_{DS}$ detects the offset in the Y-axis direction, and the induced voltage from the signal receiving coil $L_{DS}$ is sampled by a sampling circuit and rectified to obtain a voltage value. The variation of the induced voltage with the offset on the Y-axis is as shown in FIG. 9. A determination threshold is set as 0.5V. At the set determination threshold, the maximum offset on the Y-axis is 2 cm, so it can be determined that the offset correction in the Y-axis direction of the receiver coupling mechanism is completed.

Figure 10:
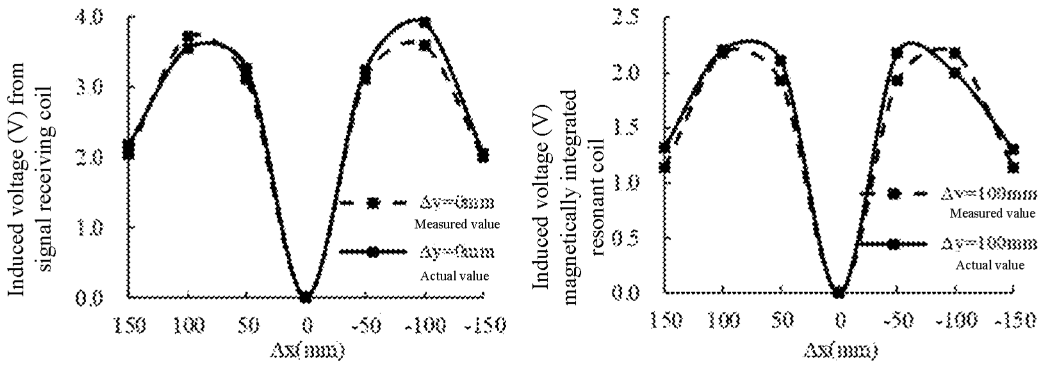
FIG. 10 is a diagram showing the variation of an induced voltage from a magnetically integrated resonant coil with $\Delta X$ according to the present disclosure.

Subsequently, verification is conducted on the detection of the offset on the X-axis using the magnetically integrated resonant coil $L_{f1}$, and similarly, the induced voltage from the magnetically integrated resonant coil $L_{f1}$ is sampled by the sampling circuit and rectified to obtain a voltage value. The variation of the induced voltage with the offset on the X-axis is as shown in FIG. 10. A determination threshold is set as 0.5V. At the set determination threshold, the maximum offset on the X-axis is 1.5 cm, so it can be determined that the offset correction in the X-axis direction of the receiver coupling mechanism is completed.

Figure 11:
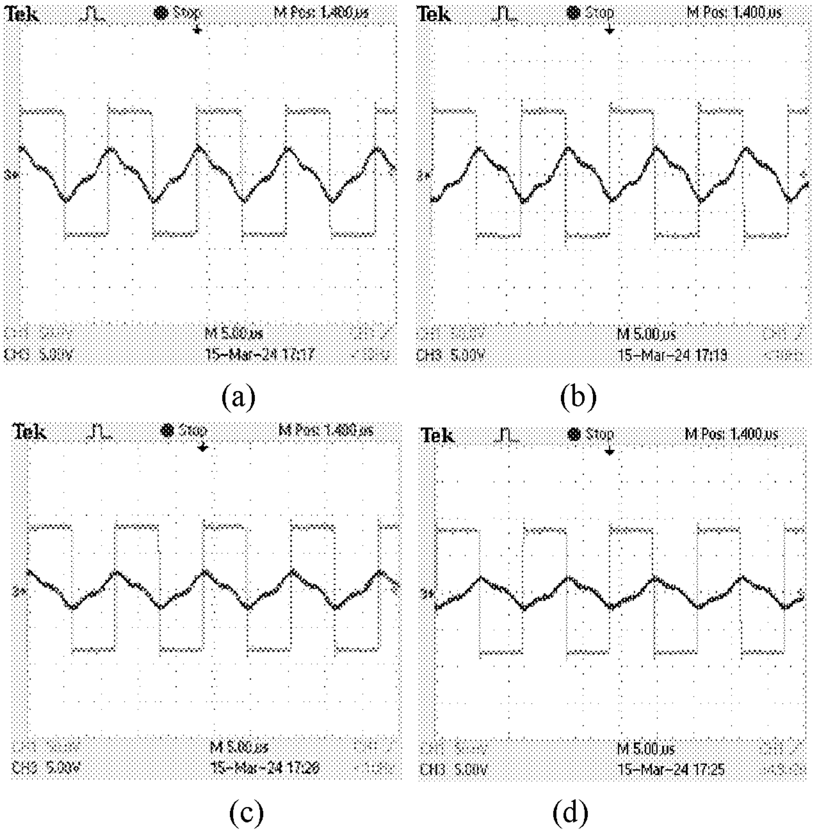
FIG. 11 is a comparison diagram of a phase difference between an inverter output voltage and an induced voltage from a magnetically integrated resonant coil in the system simulation according to the present disclosure.

The inverter output voltage is sampled and compared with the induced voltage from the magnetically integrated resonant coil $L_{f1}$, the phase difference is calculated and the direction of the offset on the X-axis is determined. The phase difference contrasts are as shown in FIG. 11. When $\Delta x>0$, the phase of the induced voltage from the magnetically integrated resonant coil $L_{f1}$ leads that of the inverter output voltage, and when $\Delta x<0$, the phase of the induced voltage from the magnetically integrated resonant coil $L_{f1}$ lags behind that of the inverter output voltage. At different offset positions, the amplitude of the induced voltage from the magnetically integrated resonant coil $L_{f1}$ changes, but the phase difference between the induced voltage of the magnetically integrated resonant coil and the inverter output voltage can still clearly reflect the offset direction of the X-axis. FIG. 11(*a*) is (Δx, Δy)=(100, 0), FIG. 11(*b*) is (Δx, Δy)=(−100, 0), FIG. 11(*c*) is (Δx, Δy)=(150, 100), and FIG. 11(*d*) is (−150, 100).

Figure 12:
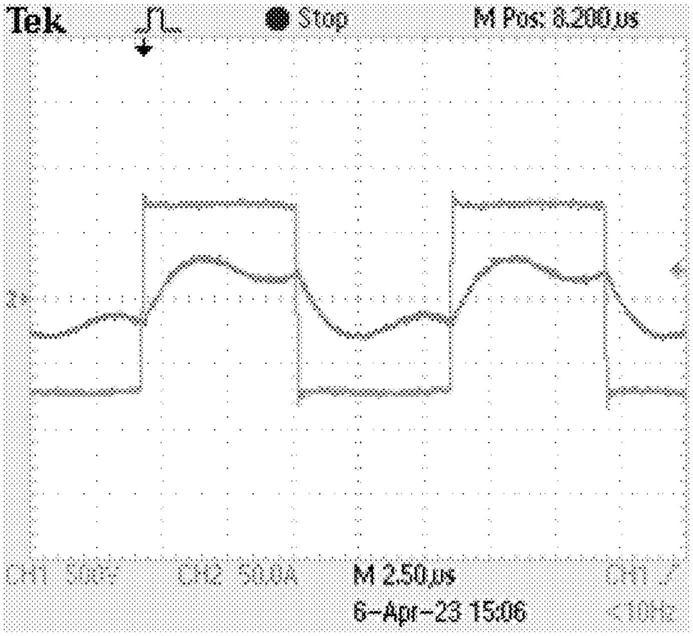
FIG. 12 shows an output voltage and current waveform of a system inverter in the system simulation according to the present disclosure.

Verification of the power transfer stage of the system: the 11 kW high-power power transfer stage of the electric vehicle static wireless power transfer system is tested, where the test condition is that when the primary-side and secondary-side coupling mechanisms are aligned, the transmission distance is 16 cm, and a charger controls the DC input voltage to be 700 V, and it is observed that the inverter output voltage and current waveforms are as shown in FIG. 12. The current waveform lags behind the voltage waveform slightly, exhibiting weak inductance, thereby facilitating the reduction of switching losses and guaranteeing the long-term use of an inverter. The inverter output voltage is 700 V and the inverter output current is 20.5 A.

The output power and transmission efficiency of the system are sampled and calculated by a power analyzer. It is derived by the simulation that the DC input voltage $U_{dc1}$ is 698.3V, the DC input current $I_{dc1}$ is 16.5 A, the load side output voltage $U_{dc2}$ is 412.6 V, the load side output current $I_{dc2}$ is 26.5 A, the DC input power $P_1$ is 11.54 kW, the system output power $P_2$ is 10.92 KW, and the system DC-DC transmission efficiency $\eta_1$ is 94.6%.

Figure 13:
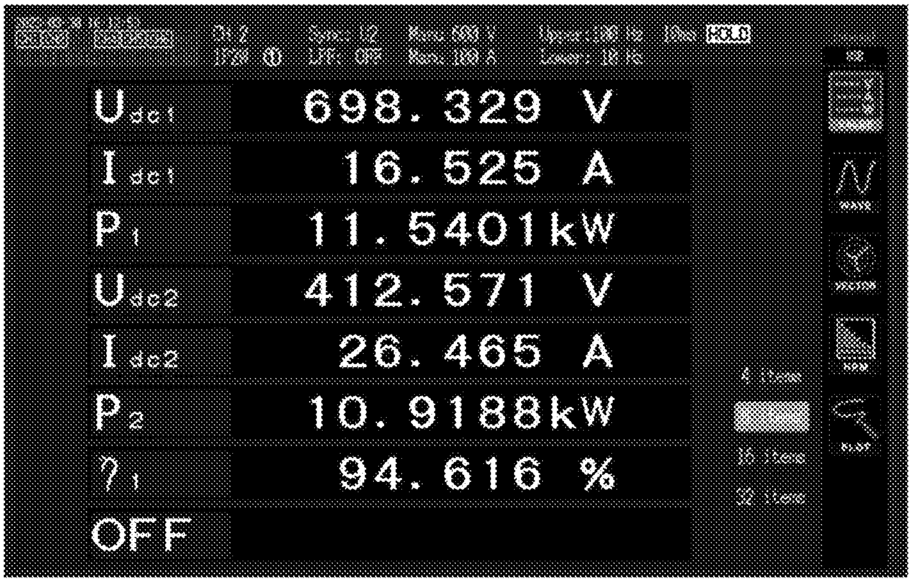
FIG. 13 is a diagram showing system output power and transmission efficiency in the system simulation according to the present disclosure.

As shown in FIG. 13, $U_{dc1}$ is DC input voltage, $I_{dc1}$ is DC input current, $P_1$ is DC input side power, $U_{dc2}$ is load side output voltage, $I_{dc2}$ is load side output current, $P_2$ is system output power, and $\eta_1$ is system transmission efficiency obtained by calculation. The DC input power is 11.54 kW, the output power is 10.92 KW, and the DC-DC transmission efficiency of the system is 94.6%.

Figure 14:
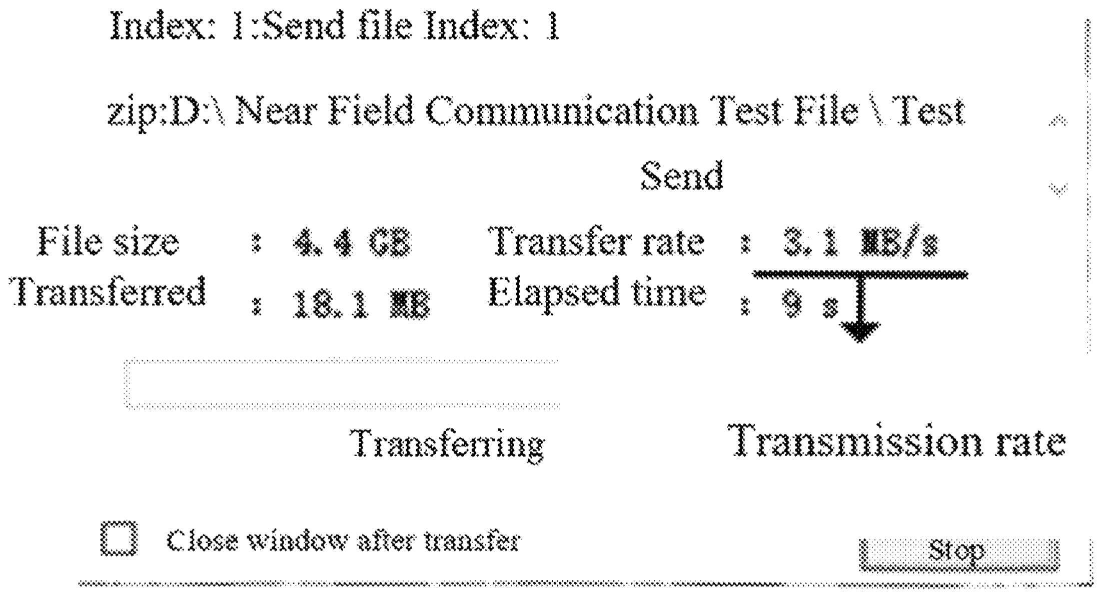
FIG. 14 is an effect diagram showing signal transmission rate in the system simulation according to the present disclosure.
Figure 15:
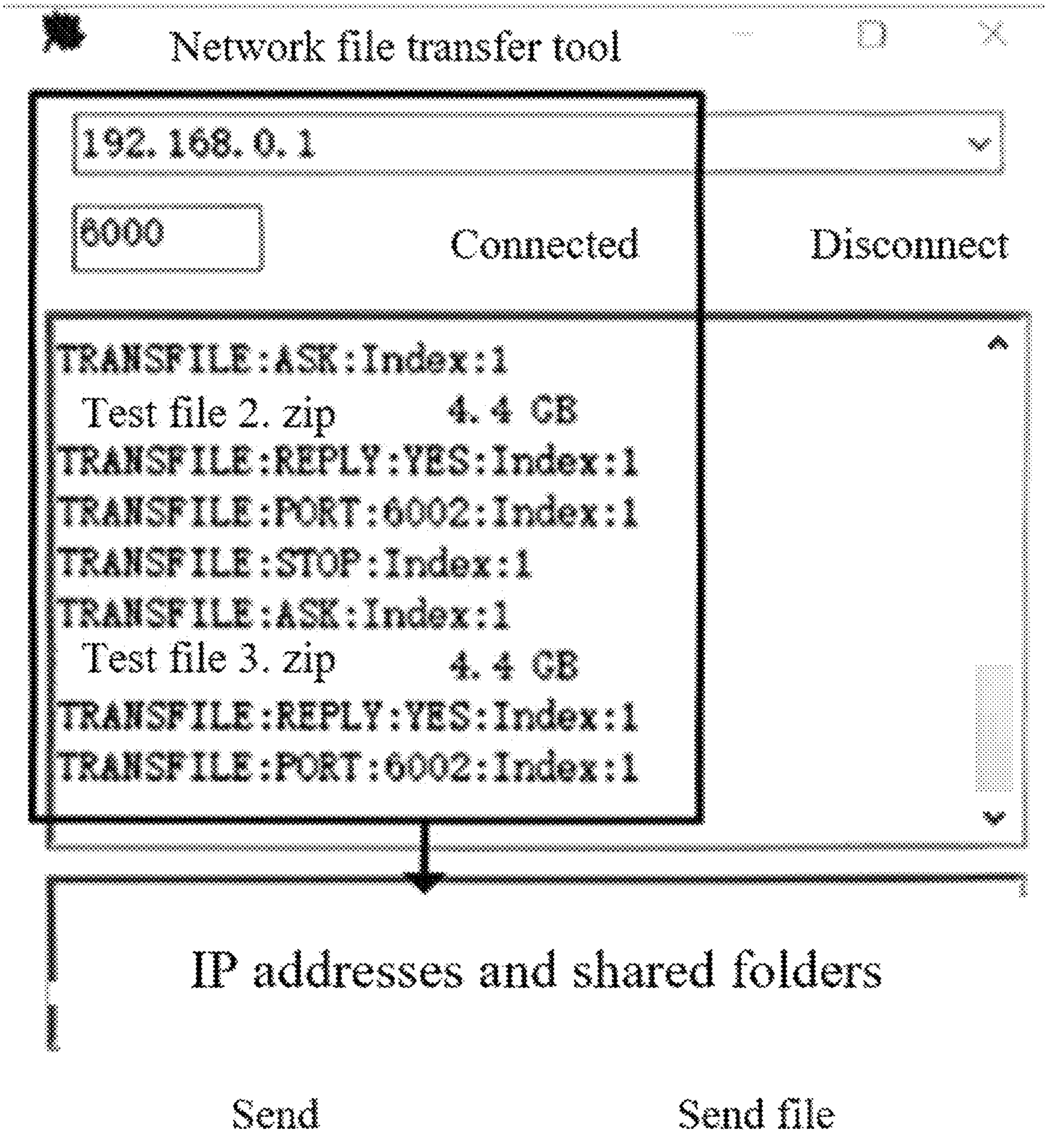
FIG. 15 is an effect diagram showing signal transmission accuracy in the system simulation according to the present disclosure.

The transmission rate of communication can be verified by sending a shared folder from a signal transmitter to a signal receiver. The file transfer rate of a computer is checked to obtain the data transfer rate. The data transfer accuracy is verified by observing the IP address of a sender and the content of a source file. The effect diagram in which signal transmission is performed using a signal transmission coil as shown in FIG. 14 shows that the transmission rate reaches 3.1 MB/s, which is approximately 24.8 Mbps, when the primary-side and secondary-side coupling mechanisms are aligned.

In summary, the simulation results of the present disclosure show that the receiver position detection method realizes the detection of the offset on the Y-axis within the range of [−200 mm, 200 mm] and the offset on the X-axis within the range of [−150 mm, 150 mm], and the offset direction of the X-axis can be determined by sampling the induced voltage from the magnetically integrated resonant coil $L_{f1}$ and the inverter output voltage and detecting the phase difference, thereby achieving a larger detection range and higher alignment detection accuracy. At the rated transmission distance of 16 cm, the system is tested for high-power power transfer, achieving that the output power is 10.92 KW, and the DC-DC transmission efficiency is 94.6%. Additionally, the communication speed of a separated signal transmission module designed in the present disclosure reaches 24.8 Mbps when the receiver and transmitter coupling mechanisms are aligned.

Finally, it should be noted that the above embodiments are provided merely to illustrate the technical solution of the present disclosure and not to limit it. Although the present disclosure has been described in detail with reference to preferred embodiments, those of ordinary skill in the art should understand that modifications and equivalent substitutions can still be made to the embodiments of the present disclosure without departing from the spirit and scope of the present disclosure, and the modifications and equivalent substitutions should be covered by the scope of the claims of the present disclosure.

What is claimed is:

1. A wireless power transfer system with a position detection function, comprising: an energy transmission component, a signal transmission component and a signal demodulation and acquisition circuit, wherein the energy transmission component comprises a power transmitting coil, a power receiving coil, and a magnetically integrated resonant coil; and the signal transmission component comprises a signal transmitting coil and a signal receiving coil; and the power transmitting coil, the magnetically integrated resonant coil and the signal transmitting coil are sequentially stacked, and the power receiving coil and the signal receiving coil are stacked; and the signal demodulation and acquisition circuit is connected to the magnetically integrated resonant coil and the signal receiving coil, respectively, and is configured to, during position detection, detect a position offset along an X-axis through the magnetically integrated resonant coil and detect a position offset along a Y-axis through the signal receiving coil;

wherein the energy transmission component further comprises a transmitter transmission circuit and a receiver transmission circuit; the transmitter transmission circuit comprises a direct current (DC) power supply, an inverter circuit and a primary-side compensation circuit that are sequentially connected, wherein an output end of the primary-side compensation circuit is connected to the power transmitting coil; and the receiver transmission circuit comprises a secondary-side compensation circuit and a rectifier-filter circuit that are sequentially connected, wherein an input end of the secondary-side compensation circuit is connected to the power receiving coil, and an output end of the rectifier-filter circuit is connected to a load; the transmitter transmission circuit further comprises a single-pole double-throw switch S configured to control connection or disconnection between the magnetically integrated resonant coil and the primary-side compensation circuit; and an input end of the single-pole double-throw switch S is connected to an output end of the inverter circuit, a control end A of the single-pole double-throw switch S is connected to one end of the magnetically integrated resonant coil, and another control end B of the single-pole double-throw switch S and another end of the magnetically integrated resonant coil are both connected to an input end of the primary-side compensation circuit.

2. The wireless power transfer system with the position detection function according to claim 1, wherein the power transmitting coil and the power receiving coil are each a Q-type coil; and the signal transmitting coil and the signal receiving coil are each a DD-type coil that is symmetric about the X-axis, and the magnetically integrated resonant coil is a DD-type coil that is symmetric about the Y-axis.

3. The wireless power transfer system with the position detection function according to claim 1, wherein during position detection, the input end of the single-pole double-throw switch S is connected to the control end B, and the magnetically integrated resonant coil is not incorporated into the primary-side compensation circuit; and during wireless power transfer, the input end of the single-pole double-throw switch S is connected to the control end A, and the magnetically integrated resonant coil is incorporated into the primary-side compensation circuit.

4. The wireless power transfer system with the position detection function according to claim 1, wherein the signal transmission component further comprises a signal modulation circuit; and an output end of the signal modulation circuit is connected to the signal transmitting coil, and an input end of the signal demodulation and acquisition circuit is connected to the signal receiving coil.

5. A position adjustment method of a wireless power transfer system with a position detection function, wherein the position adjustment method is configured to adjust a position of a receiver of the wireless power transfer system with the position detection function according to claim 1, and comprises the following steps:

S1: controlling the input end of the single-pole double-throw switch S to be connected to the control end B;

S2: acquiring an induced voltage from the signal receiving coil, determining whether an offset exists in a Y-axis direction, and adjusting the position of the receiver in the Y-axis direction; and S3: acquiring an induced voltage of the magnetically integrated resonant coil and a phase difference between the induced voltage of the magnetically integrated resonant coil and an inverter output voltage, determining whether an offset exists in an X-axis direction, and adjusting the position of the receiver in the X-axis direction.

6. The position adjustment method of the wireless power transfer system with the position detection function according to claim 5, wherein in step S2, the method of adjusting the position of the receiver in the Y-axis direction comprises:

if the induced voltage from the signal receiving coil is greater than 0, determining that an offset exists in the receiver in the Y-axis direction, adjusting the position of the receiver in the Y-axis direction, and acquiring the induced voltage from the signal receiving coil in real time until the induced voltage from the signal receiving coil is equal to 0 V, thereby completing offset correction in the Y-axis direction.

7. The position adjustment method of the wireless power transfer system with the position detection function according to claim 5, wherein in step S3, the method of adjusting the position of the receiver in the X-axis direction comprises:

if the induced voltage from the magnetically integrated resonant coil is greater than 0 V, determining that an offset exists in the receiver in the X-axis direction, and determining an offset direction based on the phase difference; and based on the offset direction, adjusting the position of the receiver in the X-axis direction, and acquiring the induced voltage from the magnetically integrated resonant coil in real time until the induced voltage from the magnetically integrated resonant coil is equal to 0 V, thereby completing offset correction in the X-axis direction.

* * * * *